US005487092A

United States Patent [19]
Finney et al.

[11] Patent Number: 5,487,092
[45] Date of Patent: Jan. 23, 1996

[54] SYSTEM FOR HIGH-SPEED SYNCHRONIZATION ACROSS CLOCK DOMAINS

[75] Inventors: Damon W. Finney, San Jose, Calif.; Michael J. Rayfield, Tucson, Ariz.

[73] Assignee: International Business Machines Corporation, Armonk, N.Y.

[21] Appl. No.: 363,121

[22] Filed: Dec. 22, 1994

[51] Int. Cl.$^6$ .......................................................... H04L 7/00
[52] U.S. Cl. ........................... 375/354; 375/371; 375/363; 375/373
[58] Field of Search .................................... 370/102, 101; 375/354, 371, 373, 377, 363, 364, 365, 366; 328/155; 377/64, 66, 78, 77, 80; 327/144, 141

[56] References Cited

U.S. PATENT DOCUMENTS

| | | | |
|---|---|---|---|
| 4,405,898 | 9/1983 | Flemming | 328/72 |
| 4,569,065 | 2/1986 | Cukier | 375/120 |
| 4,843,263 | 6/1989 | Ando | 307/480 |
| 4,868,548 | 9/1989 | Gelvin | 340/709 |
| 4,873,703 | 10/1989 | Crandall et al. | 375/118 |
| 4,907,186 | 3/1990 | Racey | 375/371 |
| 4,926,451 | 5/1990 | Yoshihara et al. | 377/48 |
| 4,975,702 | 12/1990 | Bazes | 341/155 |
| 5,034,967 | 7/1991 | Cox et al. | 375/119 |
| 5,132,990 | 7/1992 | Dukes | 375/111 |
| 5,133,064 | 7/1992 | Hotta et al. | 395/550 |
| 5,150,386 | 9/1992 | Stern et al. | 375/118 |
| 5,256,912 | 10/1993 | Rios | 307/269 |
| 5,291,529 | 3/1994 | Crook et al. | 375/109 |
| 5,295,164 | 3/1994 | Yamamura | 375/120 |
| 5,305,354 | 4/1994 | Thaller | 375/106 |
| 5,313,501 | 5/1994 | Thacker | 375/371 |
| 5,412,698 | 5/1995 | Van Brunt et al. | 375/371 |

OTHER PUBLICATIONS

R. E. Fuhs et al., "Passing Data Stream Across Asynchronous Clock Domains in Scalable Coherent Interface Bus", IBM Technical Disclosure Bulletin, vo. 36, No. 11, Nov. 1993, kpp, 373–375.

Primary Examiner—Stephen Chin
Assistant Examiner—Tesfaldet Bocure
Attorney, Agent, or Firm—Baker, Maxham, Jester & Meador

[57] ABSTRACT

A high-performance clock synchronizer for transferring digital data across the asynchronous boundary between two independent clock domains operating at hardware-limited clock speeds. The external clock signal latches each incoming data word in a boundary register. An external clock divider produces several prolonged clock signals synchronized to the external clock signal for use in distributing the incoming data words into a bank of several external buffer registers, where each word stabilizes for more than one full internal clock interval before transfer across the asynchronous boundary to a bank of corresponding internal buffer registers synchronized to the internal clock signal. A special logic inserts and deletes pad words to equalize data flow rates. Another special logic reassembles the data words in proper sequence after transfer to the internal buffer register bank. Flag latches are used to avoid asynchronous sampling of more than one bit in each data word.

19 Claims, 3 Drawing Sheets

SYSTEM FOR HIGH-SPEED SYNCHRONIZATION ACROSS CLOCK DOMAINS

BACKGROUND OF THE INVENTION

1. Field of the Invention

This invention relates generally to systems for transferring synchronous digital signals across asynchronous boundaries and specifically to a clock synchronizer for transferring digital data at hardware-limited speeds between synchronous clock boundaries.

2. Discussion of the Related Art

In systems using digital circuitry, two functional blocks operating in two different timing domains often must communicate with one another. When these two blocks operate in synchrony with a single digital clock signal, transfer of digital data between the two is not a problem. However, when any two digital subsystems operate in synchrony with different clock signals, any digital data signals traveling between them must be synchronized in some manner to avoid hardware-related data errors.

If, for example, two digital subsystems operate in synchrony with different clocks (an external clock domain and an internal clock domain), digital data signals traveling from the external clock domain to the internal clock domain must be resynchronized with the internal clock signal. Similarly, signals traveling from the internal domain to the external domain must be resynchronized with the external clock signal at the asynchronous boundary. Without such resynchronization, hardware "metastability" problems produce invalid logic results in the receiving domain, as is well-known in the art. In a bistable latch where the coincident occurrence of two pulses (a data pulse and a clock pulse, for instance) is required to change the state of the latch, a "metastable" state may occur when the two actuating pulses do not overlap sufficiently in time to permit the bistable latch to completely switch from one stable state to the other. With insufficient overlap, such as can occur when the clock signal is poorly synchronized with the data pulse, the bistable latch output may appear to change states to the other stable level but may indeed move transiently from one level to the other and then back again. When actuated by signals from two different clock domains, the metastable latch problem occurs when the clock pulse from one domain overlaps insufficiently with the data pulse synchronized to the clock from the other domain. It is particularly difficult to correct for metastability occurring during synchronous data transfer across asynchronous boundaries because the two synchronous domain clocks continually drift in relative phase.

The well-known solution to the metastable latch problem is to hold the data pulse at the bistable latch for at least two clock intervals, thereby ensuring that the latch changes state during a second full overlapping clock pulse when the first partial overlapping clock pulse is insufficient to change the latch state. This is known in the art as "double-sampling" of the incoming data pulses at the asynchronous boundary. Disadvantageously, when two independent clock domains are operating at hardware-limited clock rates, it may not be possible for the hardware to support double-sampling of incoming data pulses because of speed limitations. For appreciation of metastable operation, reference is made to Marino ("General Theory of Metastable Operation" *IEEE Trans. Computers*, Vol. C-30, No. 2, pp. 107–115, Feb. 1981), for instance.

The digital systems art is replete with schemes for digital synchronization across asynchronous boundaries. For instance, several practitioners attack the metastability problem directly. In U.S. Pat. No. 5,132,990, Dukes proposes a high-speed data synchronizer that stores the synchronized data in a transparent latch instead of a flip-flop to avoid the long set-up times required by such devices and inserts a Schmitt trigger ahead of the transparent latch to function as a matched filter to eliminate runt pulses that may cause metastability problems. In U.S. Pat. No. 4,405,898, Flemming uses a pseudo-synchronous clocking scheme to synchronize two systems of synchronous logic with dissimilar maximum clocking rate requirements by using a single oscillating source to derive two different clock signals having mutual properties specifically designed to avoid metastability.

Some practitioners prefer master clock schemes for synchronizing different independent subsystem clocks. For instance, in U.S. Pat. No. 5,133,064, Hotta et al. proposes using an original clock oscillator to deliver a single clock signal to each digital subsystem wherein the "original" clock signal is employed to phase lock the local clock signals internal to each domain. In U.S. Pat. No. 4,569,065, Cukier discloses a phase-locked clock circuit with a special adjustment command mode for controlling clock phase.

Other practitioners propose a variety of creative solutions to related problems. For instance, in U.S. Pat. No. 5,291,529, Crook et al. discloses an improved handshaking method for cross-domain data transfers that uses knowledge of the measured interboundary clock phase differences to speed the acknowledgement process without degrading metastability immunity. In U.S. Pat. No. 4,926,451, Yoshihara et al. discloses a more efficient reset switch for synchronizing an on-chip IC clock circuit intended to operate in the GHz frequency region. In U.S. Pat. No. 4,868,548, Gelvin discloses a video cursor signal synchronizer that uses a random-access memory (RAM) addressing scheme to insert a video cursor into the raster at any sub-multiple of the video clock rate. In U.S. Pat. No. 4,843,263, Ando discloses a clock timing controller for a plurality of microchips that allows an individual chip to be disabled responsive to a gate triggered by the detection of unacceptable phase slippage in the individual chip clock.

Yet other practitioners suggest using delay lines to synchronize clock domains. For instance, in U.S. Pat. No. 5,295,164, Yamimura discloses a clock synchronizer that uses dual delay lines to minimize the actual delay needed to synchronize clock signals by operating near zero differential delay instead of operating near one clock interval of differential delay. In U.S. Pat. No. 5,305,354, Thaller et al. discloses a latency-reduction scheme for delay line synchronizers that uses an "abort" gate to discard invalid asynchronous inputs before they exit from the delay line. None of these various solutions is particularly workable for improving data transfer efficiency between domains in hardware speed-limited applications.

Clock multiplication and digital delay techniques appear to offer the best chance for avoiding the metastability problem during high-speed asynchronous data transfers. For instance, in U.S. Pat. No. 5,150,386, Stem et al. disclose a clock multiplier and jitter attenuator circuit that provides a phase-locked stable clock frequency that is some multiple of the average external clock frequency. Stem et al. propose loading incoming data from the external clock domain into a FIFO line of storage cells at the external clock rate and then reading out the FIFO storage line at an internal clock rate obtained by dividing the high-speed stable clock signal.

The instantaneous jitter in the digital data stream is absorbed by the FIFO line. Stern et al. neither consider nor suggest how their technique could be applied to speed-limited asynchronous transfers in applications that cannot support a multiple clock frequency. Similarly, in U.S. Pat. No. 4,873,703, Crandall et al. disclose a brute-force synchronizing system that transfers data bytes at one clock rate to a data sink, which removes them at another clock rate. Their data sink is a RAM with the address logic required for independent read and write access. Although the Crandall et al. method successfully transfers data across an asynchronous boundary, they neither consider nor suggest synchronizing techniques suitable for hardware-limited transfer speeds that cannot support random access memory control overhead.

Perhaps the most promising class of solutions to the speed-limited asynchronous boundary metastability problem is the clock-division scheme proposed by several practitioners. For instance, in U.S. Pat. No. 4,975,702, Bazes discloses a CMOS waveform digitizer that uses two L-type registers to sample two versions of the analog input signals in parallel and in synchrony with the same clock signal to improve digital resolution without risking metastable latch states. In U.S. Pat. No. 5,034,967, Cox et al. discloses a digital synchronizer that produces a plurality of phase-shifted reference clock signals. Upon receiving an asynchronous event signal, the boundary-transfer logic examines these phase-shifted clock signal versions and selects one of them with which to sample the incoming asynchronous event signal, thereby avoiding metastable latch operation. In U.S. Pat. No. 5,256,912, Rios discloses a synchronizer apparatus wherein a plurality of clocking signals are generated by a specialized clocking circuit within a boundary synchronizer module incorporating transparent latches. Rios creates several master clock phase signals in each of many parallel synchronizer cells (one cell transfers one bit) and delays transfer of the data bit from each cell for at least one full master clock interval to permit settling and avoid metastability. Reference is also made Fuhs et al. ("Passing Data Stream Across Asynchronous Clock Domains in Scalable Coherent Interface Bus", *IBM Technical Disclosure Bulletin*, Vol. 36, No. 11, pp. 373–375, Nov. 1993) for a description of a method for passing a string of an unknown number of data words from one clock domain to another within a VLSI chip. Fuhs et al. propose using a storage array as a buffer between the two clock domains and disclose special logic necessary to control the reading from the array of the data words in the new clock domain. This logic uses a Sliding Window Synchronizer that polls a plurality of synchronizing latches to ensure that the incoming data words remain in the array for more than one clock interval to avoid metastability. Fuhs et al. neither consider nor suggest how their high-speed window polling scheme can be applied to synchronize data transfers at hardware-limited clocking speeds.

Accordingly, there is yet a clearly-felt need in the art for an asynchronous data transfer clock synchronizing scheme that avoids metastability when operating at the hardware speed limit that precludes analysis, measurement and frequency-multiplication. The related unresolved problems and deficiencies are clearly felt in the art and are solved by this invention in the manner described below.

SUMMARY OF THE INVENTION

This invention solves the above problem by distributing incoming data words to a plurality of external buffer registers where they remain long enough to stabilize the registered latch states before parallel transfer to a second plurality of internal buffer registers under internal clock control. This invention for the first time solves the resulting flow-control problem by reassembling incoming data words in the proper order following their distribution to the buffer registers without inserting additional polling cycles.

It is an object of this invention to provide a circuit that guarantees the transfer of digital data received from a different clock domain across the asynchronous domain boundary without error and without slowing unrelated to differences in clock rates. It is a feature of the system of this invention that incoming data words are distributed to a plurality of registers wherein each stabilizes for a plurality of internal clock intervals before transfer under internal clock control. It is an advantage of the method of this invention that the transfer and reassembly procedure requires no slowing for "flow control" except to adjust for actual differences in clock rates between the domains.

It is another object of the system of this invention to provide clock domain synchronization for clock signals operating at the hardware speed limit. It is a feature of the system of this invention that all polling and slave clock signals operate at or below the domain clock speed, thereby avoiding hardware-limited speed problems. It is an advantage of the circuit of this invention that all "idle" or "pad" words received from the external clock domain are decoded and eliminated to enhance speed and to ensure proper flow control.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
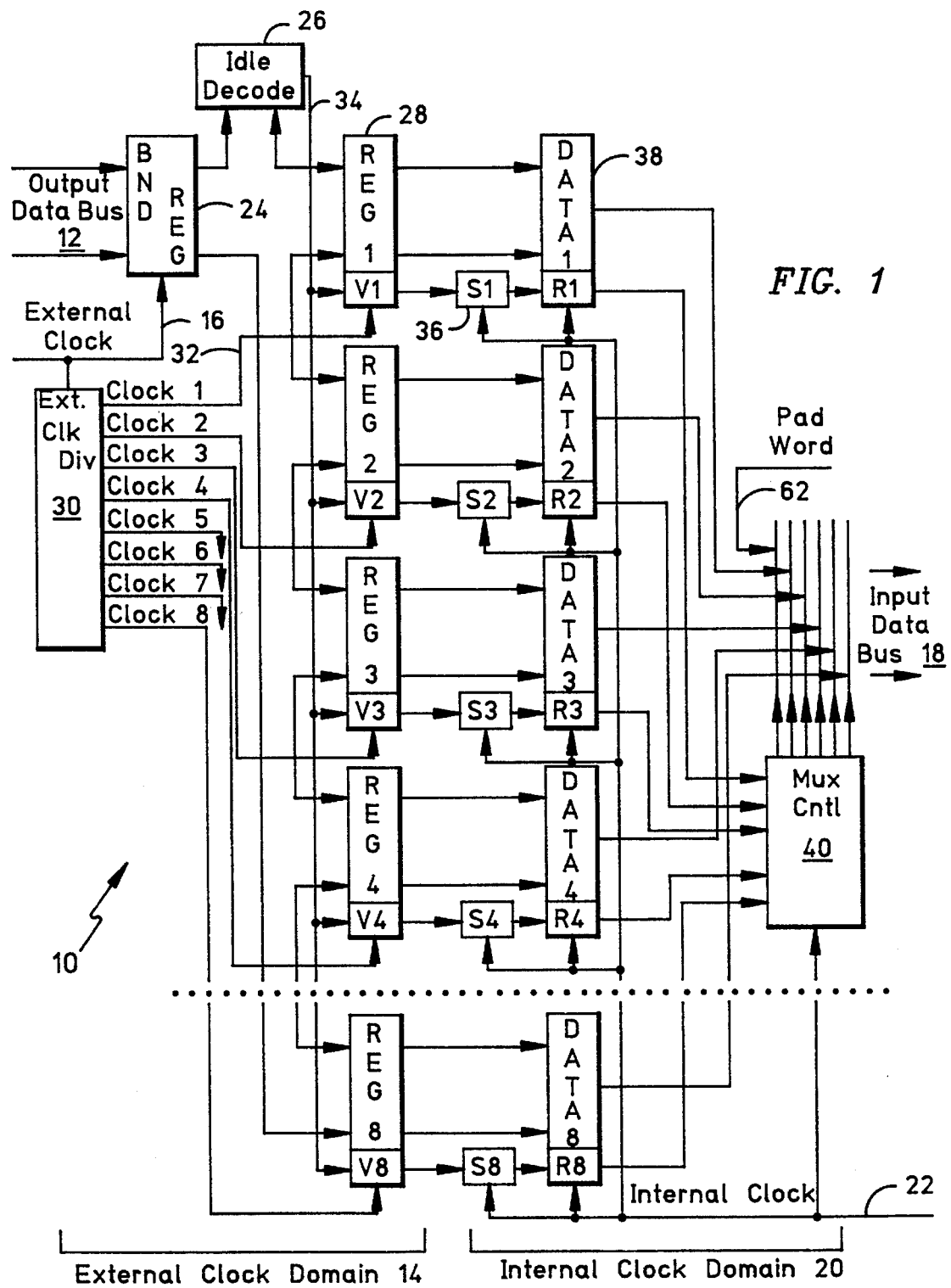
FIG. 1 shows a functional block diagram of the synchronization logic of the system of this invention.

FIG. 1 shows a functional block diagram of the synchronization logic of 10 of the system of this invention. Digital signals representing data words arrive at the output data bus 12 in the external clock domain 14, which operates in synchrony with an external clock signal 16. These data words are synchronized to the new domain and produced at the input data bus 18 in the internal clock domain 20, which operates in synchrony with an internal clock signal 22.

The incoming data at bus 12 arrives at the maximum clock rate supported by the gate array technology. Thus, although a prolonged sampling time is required to avoid metastable operation of the circuit elements, the synchronizer elements must operate at or below the frequency of the external clock signal 16. This is accomplished by extending the external clock signal 16 into logic 10 to synchronize the operation of a boundary register 24, an idle decoder 26 and eight external buffer registers exemplified by the external buffer register 28. External clock signal 16 also is coupled to an external clock divider 30, which divides external clock signal 16 by a factor of eight to produce eight prolonged external clock signals exemplified by the prolonged external clock signal 32 coupled to external buffer register 28. Each of the eight prolonged clock signals exemplified by signal 32 are connected to a corresponding one of the plurality of external buffer registers exemplified by register 28.

Using the eight prolonged external clock signals generated in external clock divider 30, the incoming data words are distributed to the eight external buffer registers in turn, as each arrives in buffer register 24. Before transfer from boundary register 24 to the $N^{th}$ external buffer register, each data word is decoded by idle decoder 26 to determine if it is a "pad" word inserted in the arriving data stream for external domain flow control purposes. If idle decoder 26 finds a pad word, it raises an idle flag on line 34, which resets a valid flag VN in the $N^{th}$ external buffer register exemplified by valid flag V1 in register 28. Thus, although the pad word is actually stored in the $N^{th}$ external buffer register, it is henceforth ignored by logic 10 because of the reset state of valid flag VN. If the data word is not a pad word, the $N^{th}$ valid flag VN is set by the $N^{th}$ prolonged external clock signal when the data word is moved from boundary register 24 to the $N^{th}$ external buffer register.

Because the eight external buffer registers exemplified by register 28 are clocked using the same external clock frequency used to send the incoming data to bus 12, there are no asynchronous clocking or metastability problems expected in the external buffer registers. Because each external buffer register exemplified by register 28 receives a second data word only after eight external clock intervals, the first data word remains in register 28 for a substantial time beyond the two internal clock intervals needed to ensure settling of the register latch states. This allows each data word stored in external buffer register 28 to be sampled in synchrony with internal clock signal 22 without risking metastability problems in the latch states within register 28. To ensure sufficient settling time, each of the eight external buffer register valid flags, exemplified by valid flag V1, is coupled through a sampling circuit, exemplified by the sampling circuit 36, to an associated internal buffer register, exemplified by the internal buffer register 38 associated with external buffer register 28. Like external buffer register 28, internal buffer register 38 includes a flag, denominated the "ready" flag R1.

During the settling time, only the valid flag V1 is sampled by sampling logic 36 because only one bit can be sampled asynchronously without risking data error. The sampling of valid bit V1 by sampling logic 36 represents the precise point of data transfer across the asynchronous boundary between external clock domain 14 and internal clock domain 20 in the system of this invention.

After sampling circuit 36 ensures that valid flag V1 in register 28 is properly set and settled, and after ready flag R1 in register 38 is reset to indicate the availability of internal buffer register 38, only then is the data word in register 20 transferred to register 38 in synchrony with internal clock signal 22. Upon such transfer, ready flag R1 is set in internal buffer register 38 to show that the data word is ready for presentation to bus 18 by the multiplexer controller 40.

At this point, the data word has been successfully transferred without error across the asynchronous boundary between clock domains. However, because of the several different flags governing the actual transfer, the data words in the eight internal buffer registers exemplified by register 38 may not be ordered in register-sequence and must now be reassembled in proper sequence. This resequencing is controlled by multiplexer controller 40 in the manner described below.

If the internal and external clock domains operated at precisely the same frequency, the data word resequencing is trivial because only one internal buffer register contains a valid data word at any particular time. Because the internal and external clock signal frequencies differ in general, data words may arrive on bus 12 more rapidly than they are removed from the buffer registers or, conversely, the data words may be removed from the buffer registers more rapidly than they arrive on bus 12. These two problems can be handled by inserting and deleting "idle" or pad words to control data flow in the manner known in the art. However, it is also possible herein that two data words in the internal buffer registers exemplified by register 38 are judged to be "valid" during a single internal clock interval because of the asynchrony of the sampling circuits exemplified by sampling circuit 36 and the valid flags exemplified by valid flag V 1 in register 28. Thus, additional logic is necessary to ensure proper resequencing of the data words after their arrival in the internal buffer registers.

Figure 2:
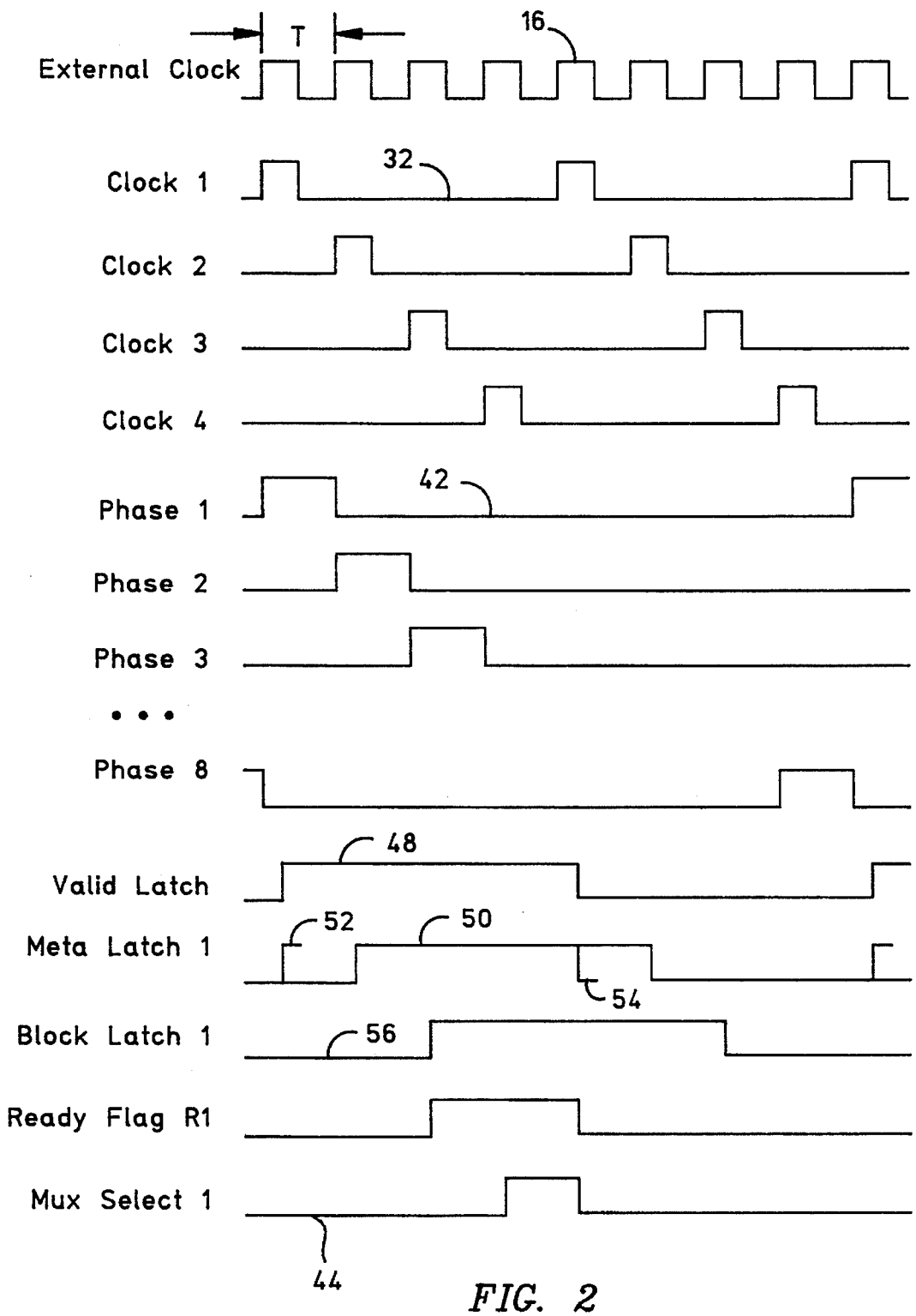
FIG. 2 is a timing diagram illustrating the timing relationships between signals used in the synchronization logic of FIG. 1.

FIG. 2 illustrates the timing of the several signals within external clock domain 14 of FIG. 1. External clock signal 16 is shown having an interval T. Prolonged external clock signal 32 is shown having an interval equal to 8T with a pulse width of T/2. In the exemplary embodiment shown in FIG. 1, each prolonged clock signal exemplified by signal 32 is used to produce a second signal that is herein denominated a prolonged clock phase, exemplified by phase signal 42. Phase signal 42 is also shown with an interval of 8T but it has a prolonged pulse width that persists for the full external clock signal interval T.

Figure 3:
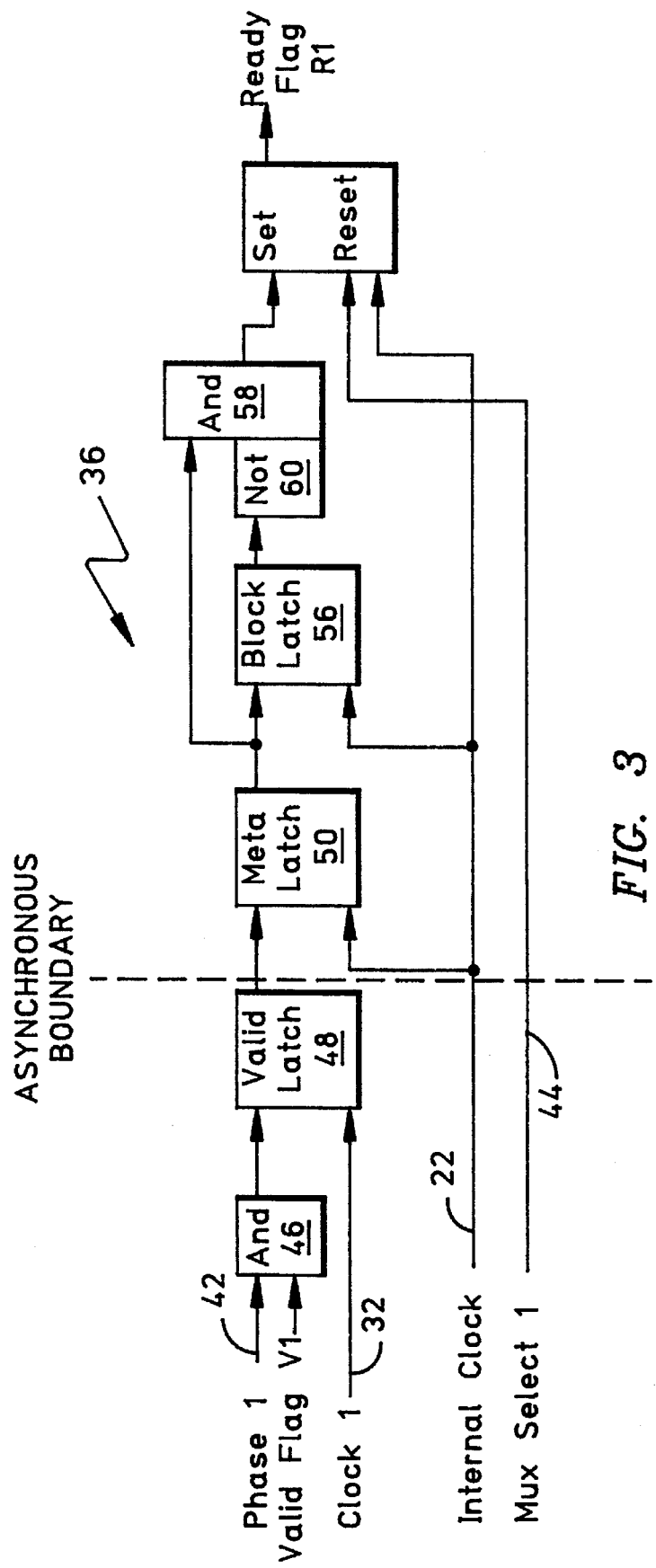
FIG. 3 shows a functional block diagram illustrating the data sampling logic of the system of this invention.

FIG. 3 shows a functional block diagram of sampling circuit 36 from FIG. 1. The input signals include prolonged clock phase signal 42, valid flag V 1 from external buffer register 28, prolonged external clock signal 32, internal clock signal 22 and a multiplexer select line 44. When both phase signal 42 and valid flag V1 are set (high), the output of the AND-gate 46 rises and is latched in a valid latch 48 in synchrony with prolonged external clock signal 32. AND-gate 46 operates with the four prolonged external clock signals shown in FIG. 2 instead of the eight that would otherwise be required because both clock signal 32 and phase signal 42 must be high before valid flag V1 is transferred to valid latch 48.

It is the bit in valid latch 48 gated by external clock signal 32 that is transferred across the asynchronous boundary to the metalatch 50, which is gated by internal clock signal 22. Because of the asynchronous boundary, metalatch 50 may experience metastable states during transfer. In FIG. 2, the metalatch signal 50 is shown with metastable states 52 (rising) and 54 (falling). The two metastable states 52 and 54 represent "first" samplings of the input data in metalatch 50 by "partial" internal clock pulses (not shown) and these first samplings must be ignored by the system of this invention to ensure operation free from metastability errors. Accordingly, the metalatch 50 waveform in FIG. 2 is shown as changing state only after a "second" sampling by a full internal clock interval (not shown).

In FIG. 3, the bit stored in metalatch 50 is transferred to the block latch 56 by the next internal clock pulse 22. To avoid metastability problems in metalatch 50, the AND-gate 58 and the inverter 60 pose a logical requirement that prevents ready flag R1 from being set until the outputs of metalatch 50 and block latch 56 are both high. In FIG. 2, ready flag R1 is shown as rising with block latch 56 nearly two complete internal clock intervals after valid latch 48 is first set.

Returning to FIG. 1, multiplexer controller 40 operates to reassemble the internal buffer data words in correct order. This process includes two distinct operations. The first operation discards all incoming pad words in the manner discussed above in connection with idle decoder 26. These pad words are discarded by resetting valid bit VN in the corresponding external buffer register upon detection of a pad word. Multiplexer controller 40 also inserts a pad word whenever there is no data word available in any of the eight internal buffer registers exemplified by register 38. This pad word is produced on bus 62 and switched to output bus 18 under the control of multiplexer controller 40 when all eight ready bits RN are low (reset). This pad word deletion and insertion operation provides all necessary flow control even when the incoming data frequency is higher than the internal frequency, provided that sufficient pad words are received periodically from the external clock domain. As an example, in digital systems with clock oscillator accuracies of ±0.005 percent, one pad word during every 10,000 clock intervals is sufficient to ensure proper operation with this simple flow control scheme.

The second important operation of multiplexer controller 40 is the reassembly of data words in the sequence actually received. This is accomplished by selecting the data word from each internal buffer register in round-robin sequence and bypassing any internal buffer register whose ready bit is reset for some reason, such as having received a pad character during that time slot. This procedure reorders the data words properly because the ready flags for data words received later in the data word stream can never be set ahead of the ready flags for earlier-received data words. Although the ready flags for two data words can be set during a single internal clock interval (herein denominated "simultaneously"), the preceding data word is associated with the ready flag that is first in the round-robin order unless there were no ready flags set immediately before the two new ready flags are received.

If there is no data word ready in any of the internal buffer registers and then two ready flags are set in the same cycle, the round-robin scheme alone is insufficient to ensure proper ordering. Advantageously, the two flags must be adjacent in round-robin sequence. To handle this particular problem, special logic (not shown) is provided in multiplexer controller 40 to select the correct data word first in such circumstances. This logic is described as follows:

If two ready flags become active simultaneously when no other ready flag is set, then the first ready flag in sequence is selected (e.g., R1, R2 being set means that R1 is selected; R1, R8 being set means that R8 is selected because R8 is immediately before R1 in sequence; etc.). If at least one ready flag is set in the eight internal buffer registers during the previous internal clock interval, then multiplexer controller 40 merely continues with the round-robin procedure to select the next data word in the sequence.

After selecting a data word from the eight internal buffer registers exemplified by register 38, controller 40 immediately resets the corresponding ready flag, which can be appreciated with reference to multiplexer select line 44 shown in FIGS. 2 and 3.

Because it is possible that a long stream of data words could be received with no pad words, the system of this invention also provides for duplex flow control to prevent overrun caused by differences in clock frequencies between two domains. A simple logic circuit (not shown) is provided in multiplexer controller 40 to produce a request to the external clock domain for insertion of a pad word whenever all eight ready flags are simultaneously set in the internal buffer registers exemplified by register 38. However, in the situation where hardware clock frequency accuracy is ±0.005 percent and both internal and external clocks are set to the same nominal frequency, such a request is never required more often than once during every 50,000 data word transfers. This can be appreciated by considering that if one clock is worst-case fast and the receiving clock is worst-case slow, there is only one additional data word accumulated for every 10,000 processed. Thus, if two ready flags are set initially, then an additional ready flag can be set only after 10,000 data words are processed. With eight internal buffer registers, at least 50,000 data words must be received without a single pad word before all eight ready flags are set in the exemplary embodiment of the system of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for transferring digital signals representing a plurality of data words including pad words from an output bus in an external clock domain operating in synchrony with an external clock signal having a frequency and an interval across an asynchronous boundary to an input bus in an internal clock domain operating in synchrony with an internal clock signal having a frequency and an interval, said method comprising the steps of:

(a) storing in a first register, in synchrony with said external clock signal, each in turn of a sequence of said data words from said output bus;

(b) producing, in synchrony with said external clock signal, a plurality of N of prolonged external clock signals each associated with one of a plurality N of second registers and each having an interval substantially equal to a plurality N of said external clock intervals;

(c) for each said prolonged external clock signal, transferring in synchrony with said each prolonged external clock signal said data word from said first register to said one second register associated with said each prolonged external clock signal and setting a valid flag in said one second register if said first register word is not an incoming pad word;

(d) transferring to a plurality N of third registers, each having a ready flag, said data word from each said second register associated with one of said third registers in which said ready flag is set;

(e) in synchrony with said internal clock signal, setting said ready flag in said third register associated with each said second register in which said valid flag has been set for more than one said internal clock signal interval; and (f) connecting in sequence to said input bus, in synchrony with said internal clock signal, said data word from each said third register in which said ready flag is set and resetting said ready flag.

2. The method of claim 1 further comprising the step of:
(g) producing, in synchrony with said internal clock signal, an internal clock domain pad word at said input bus when no said ready flag is set in any said third register.

3. The method of claim 2 further comprising the step of:
(h) requesting said incoming pad word from said external clock domain when all said ready flags are set in said plurality N of third registers.

4. The method of claim 1 further comprising the step of:
(g) requesting said incoming pad word from said external clock domain when all said ready flags are set in said plurality N of third registers.

5. In a digital data system, a clock synchronizer system for transferring digital signals representing a plurality of data words including pad words from an output bus in an external clock domain operating in synchrony with an external clock signal having a frequency and an interval across an asynchronous boundary to an input bus in an internal clock domain operating in synchrony with an internal clock signal having a frequency and an interval, said system comprising:

input register means coupled to said output bus for receiving said data words in synchrony with said external clock signals;

prolonged storage register means coupled to said input register means including a plurality N of prolonged storage registers and including means for distributing in synchrony with said external clock signal a plurality N of said data words to said prolonged storage registers to be stored for a plurality N of said external clock intervals;

sampling register means coupled to said prolonged storage register means including a plurality N of sampling registers and including means for transferring in synchrony with said internal clock signal each said data word that has been held for at least one said internal clock interval in one said prolonged storage register to an associated one of said plurality of sampling registers; and multiplexer means coupled to said input bus and to said sampling register means for reassembling said data words in sequence at said input bus in synchrony with said internal clock signal.

6. The system of claim 5 further comprising:
flow control means in said multiplexer means for inserting internal clock domain pad words at said input bus in said reassembled data word sequence to equalize the internal and external data word flow rates, including means for requesting pad words from said external clock domain.

7. The system of claim 6 further comprising:
data compaction means coupled to said input register means for deleting incoming pad words from said incoming plurality of data words.

8. The system of claim 5 further comprising:
data compaction means coupled to said input register means for deleting incoming pad words from said incoming plurality of data words.

9. A clock synchronizer system for transferring digital signals representing a plurality of data words including pad words from an output bus in an external clock domain operating in synchrony with an external clock signal having a frequency and an interval across an asynchronous boundary to an input bus in an internal clock domain operating in synchrony with an internal clock signal having a frequency and an interval, said system comprising:

first register means for accepting and storing in turn each of a sequence of said data words from said output bus in synchrony with said external clock signal;

clock divider means coupled to said external clock signal for producing, in synchrony with said external clock signal, a plurality of N of prolonged external clock signals each having an interval substantially equal to a plurality N of said external clock intervals;

a plurality N of second register means each coupled to a corresponding one of said prolonged external clock signals, each said second register means being for storing said data word from said first register means, in synchrony with said one corresponding prolonged external clock signal, and each including valid flag means for setting a valid flag if said first register word is not an incoming pad word;

a plurality N of third register means each having ready flag means for storing a ready flag and each coupled to said internal clock signal and a corresponding one of said second register means, said third register means being for storing said data word from said corresponding second register means when said ready flag is set;

a plurality N of sampling means each coupled between said ready flag means in one of said third register means and said valid flag means in said corresponding second register means, each said sampling means being for setting said ready flag in said third register means associated with said each second register means in which said valid flag has been set for more than one said internal clock signal interval; and multiplexer means coupled to said plurality of third register means for connecting in sequence to said input bus, in synchrony with said internal clock signal, said data word from said each third register means in which said ready flag is set and for resetting said ready flag.

10. The system of claim 9 further comprising:
multiplexer controller means in said multiplexer means for producing, in synchrony with said internal clock signal, an internal clock domain pad word at said input bus when no said ready flag is set in any said third register means.

11. The system of claim 10 further comprising:
flow control means in said multiplexer means for producing a signal requesting said incoming pad word from said external clock domain when all said ready flags are set in said plurality N of third register means.

12. The system of claim 9 further comprising:
flow control means in said multiplexer means for producing a signal requesting said incoming pad word from said external clock domain when all said ready flags are set in said plurality N of third register means.

13. A synchronizing circuit for transferring digital signals representing a plurality of data words including pad words from an output bus in an external clock domain operating in synchrony with an external clock signal having a frequency and an interval across an asynchronous boundary to an input bus in an internal clock domain operating in synchrony with an internal clock signal having a frequency and an interval, said circuit comprising:

a boundary register coupled to said output bus for storing each said data word in turn synchronously with said external clock signal;

a clock divider coupled to said external clock signal for producing a plurality N of prolonged external clock signals each having an interval of substantially N said external clock intervals;

a plurality N of external buffer registers coupled to said boundary register each having a valid flag and each coupled to and synchronized with an associated one of said prolonged external clock signals;

a plurality N of internal buffer registers each having a ready flag and each synchronized to said internal clock signal and coupled to an associated one of said external buffer registers;

a plurality N of flag sampling circuits synchronized with said internal clock signal, each coupled between an associated pair of said internal and external buffer registers for setting said ready flag after said valid flag has been set for more than one said internal clock interval; and a multiplexer coupled to said internal buffer registers for connecting in sequence to said input bus each said internal buffer register having said ready flag set including means for resetting said ready flag in said connected input buffer register.

14. The circuit of claim 13 further comprising:

an idle decoder coupled to said boundary register for decoding said boundary register word and for producing an idle flag responsive to an incoming pad word, said idle flag operating to reset said valid flag in a corresponding one of said external buffer registers.

15. The circuit of claim 14 further comprising:

a pad word generator in said multiplexer for producing an internal clock domain pad word at said input bus when no said ready flag is set in any of said internal buffer registers.

16. The circuit of claim 15 further comprising:

a flow interrupt controller in said multiplexer for producing a signal requesting said incoming pad word from said external clock domain when said ready flags are set in all said internal buffer registers.

17. The circuit of claim 14 further comprising:

a flow interrupt controller in said multiplexer for producing a signal requesting said incoming pad word from said external domain when said ready flags are set in all said internal buffer registers.

18. The circuit of claim 13 further comprising:

a pad word generator in said multiplexer for producing an internal clock domain pad word at said input bus when no said ready flag is set in any of said internal buffer registers.

19. The circuit of claim 18 further comprising:

a flow interrupt controller in said multiplexer for producing a signal requesting an incoming pad word from said external domain when said ready flags are set in all said internal buffer registers.

* * * * *